United States Patent [19]

Dimmick et al.

[11] Patent Number: 4,987,768
[45] Date of Patent: Jan. 29, 1991

[54] METHOD AND APPARATUS FOR INSPECTION OF CONTAINERS

[75] Inventors: Henry M. Dimmick, Butler; Paul Schneider, Valencia; Richard Spryn, Fenelton, all of Pa.

[73] Assignee: AGR International, Inc., Butler, Pa.

[21] Appl. No.: 426,426

[22] Filed: Oct. 24, 1989

[51] Int. Cl.⁵ .............................................. G01M 3/32
[52] U.S. Cl. ...................................... 73/37.5; 33/542; 73/49.2
[58] Field of Search ............... 73/37.5, 49.2, 37, 37.9; 33/522, 542; 209/522, 531, 532

[56] References Cited

U.S. PATENT DOCUMENTS

| 3,390,569 | 7/1968 | McMeekin | 73/37.9 X |
| 3,805,593 | 4/1974 | Sandoz et al. | 73/49.2 |
| 3,914,872 | 10/1975 | Strzala | 33/522 |
| 3,995,473 | 12/1976 | Flamand et al. | 73/49.2 |
| 4,055,985 | 11/1977 | Munz | 73/49.2 |
| 4,278,173 | 7/1981 | Pemberton et al. | 33/542 X |
| 4,459,843 | 7/1984 | Durham | 73/37 |
| 4,768,372 | 9/1988 | Lehmann | 73/49.2 |

FOREIGN PATENT DOCUMENTS

| 82404 | 7/1981 | Japan | 73/37.5 |
| 2078380 | 1/1982 | United Kingdom | 73/49.2 |

Primary Examiner—Hezron E. Williams
Assistant Examiner—Joseph W. Roskos
Attorney, Agent, or Firm—Arnold B. Silverman

[57] ABSTRACT

Apparatus and an associated method for inspecting a container neck for the desired shape includes an upper body portion having an elongated bore therethrough, and a downwardly projecting lower body portion having a passageway generally aligned with the bore. The lower body portion has an outer surface corresponding to the desired shape of the inner portion of the container neck but of a size corresponding to the minimum permissible inside diameter of the container neck. In one embodiment the lower body portion has at least one vent opening to facilitate improved container neck inspection. Sealing material is provided such that when the container neck is of the desired shape the lower body portion will be received within the neck in such a manner that the passageway will be in sealed communication with the container interior.

3 Claims, 3 Drawing Sheets

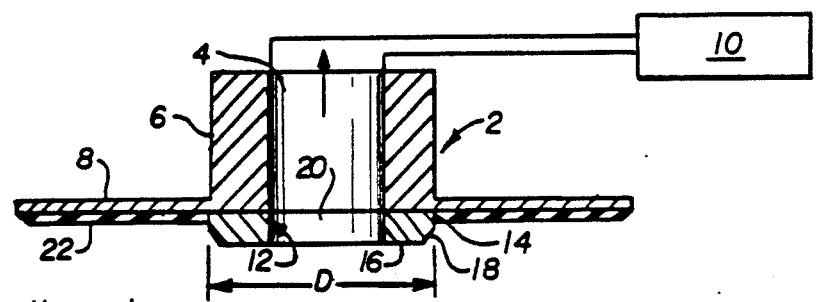
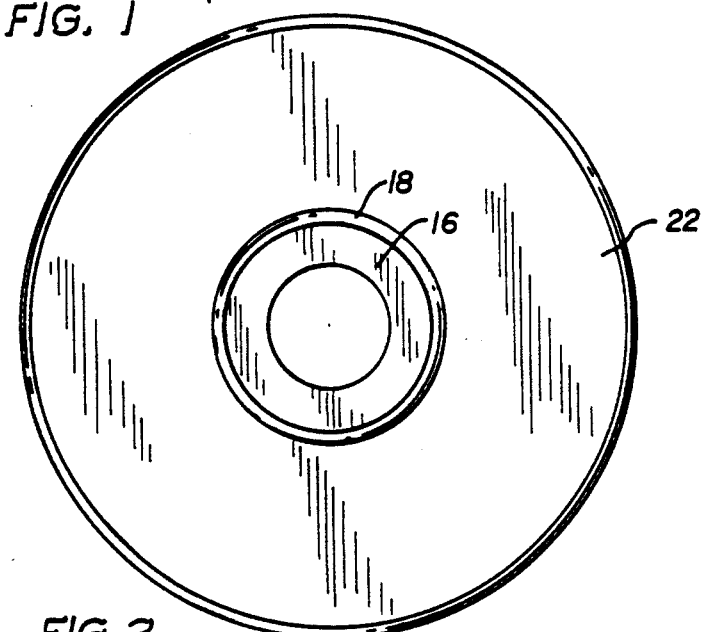
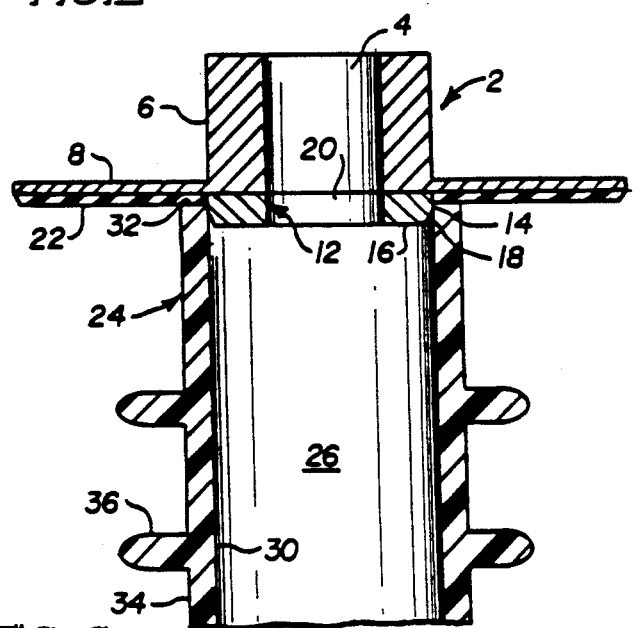

METHOD AND APPARATUS FOR INSPECTION OF CONTAINERS

BACKGROUND OF THE INVENTION

1. Field of the Invention

The present invention provides a method and apparatus for determining whether the interior of a container neck has the desired shape and, more specifically, for determining whether container necks have a desired cylindrical configuration or have undesired ovality or other deformity.

2. Description of the Prior Art

It has been known to manufacture plastic bottles out of a wide variety of materials such as polyethylene terephthalate (PET), for example, for use as beverage containers. In such manufacture it has been known to create preforms by injection molding and to subsequently convert these preforms into containers as by a blow-molding bottle-forming process.

One of the problems encountered in connection with this type of bottle manufacture is that frequently the bottle necks of the preforms which are to be of generally cylindrical shape and have external threads for securing a closure thereto are not of the desired round or cylindrical configuration, but rather contain a defect in shape. A common defect of this type is ovality wherein the preform container neck has an oval rather than round shape.

One of the reasons such a preform may have ovality is that the preform may warp during cooling after molding. A second reason for ovality is that a preform which is still warm may be partially crushed as it is unloaded from the injection molding machine.

Another common defect is an indentation caused by localized forces from a relatively sharp object. Although the localized forces may be applied at a point in the finish region other than near the open end, the open end will be deformed.

Attempts to convert an oval or otherwise out of shape preform into a bottle create problems In the blow-molding bottle-forming process, the preforms are placed on spindles designed to fit inside the threaded neck of the preform. An oval preform will not fit properly on the spindle and this leads to production problems. In the event that the oval or otherwise out of shape preforms survive the production process, they will be made into bottles the threaded neck of which may not fit a threaded cap, thus causing undesired loss of carbon dioxide or even product from the container.

There is a substantial need for an inspection system which will determine whether the container neck has the desired shape or has ovality or other undesired defects.

SUMMARY OF THE INVENTION

The apparatus and associated method of the present invention have solved the above described problem.

The apparatus for inspection of a container neck for the desired shape includes an upper body portion having an elongated bore therethrough and a downwardly projecting lower body portion having a passageway aligned with and in communication with the upper body portion bore. The lower body portion has a cylindrical outer surface of maximum dimension equal to or slightly less than the desired minimum permissible inside diameter of the container neck. Sealing means are positioned in underlying relationship with respect to the upper body portion and adjacent to the lower body portion such that insertion of the lower body portion into a container neck of the desired shape will result in sealed engagement and permit sealed communication between the bore and the container interior through the passageway.

The lower body portion preferably has a generally cylindrical lateral surface and an annular lower surface with a lower portion of the annular surface being tapered generally downwardly and inwardly. The sealing means preferably are of an annular configuration and are secured to the lower surface of the upper body portion and sealingly connected to the lateral surface of the lower body portion. Means are provided for determining if the lower body portion has been sealingly received in the container neck so as to avoid leakage and thereby establish sealed communication between the upper body portion bore and the container interior. This indicates the presence of a container neck of desired configuration.

The method of the invention preferably employs the apparatus hereinbefore described with the lower body portion being inserted into the container neck interior and a determination being made as to whether it was received in sealed engagement thereby indicating that a container neck of the desired shape is being inspected.

It is an object of the present invention to provide apparatus for determining whether a container neck has the desired configuration.

It is a further object of the present invention to provide a system for making such a determination which will determine whether the container interior is round or has departed from specifications by being oval or of another undesired shape.

It is a further object of the invention to provide such a system which is readily adapted to be incorporated into existing container inspection systems.

These and other objects of the invention will be more fully understood from the following description of the invention on reference to the illustrations appended hereto.

BRIEF DESCRIPTION OF THE DRAWINGS

FIG. 1 is a cross-sectional illustration of a form of shape inspection apparatus of the present invention.

FIG. 2 is a bottom plan view of the inspection apparatus shown in FIG. 1.

FIG. 3 shows a cross-sectional illustration of the shape inspection apparatus of FIG. 1 sealingly engaged within a container neck of desired shape.

DESCRIPTION OF THE PREFERRED EMBODIMENTS

Figure 4:
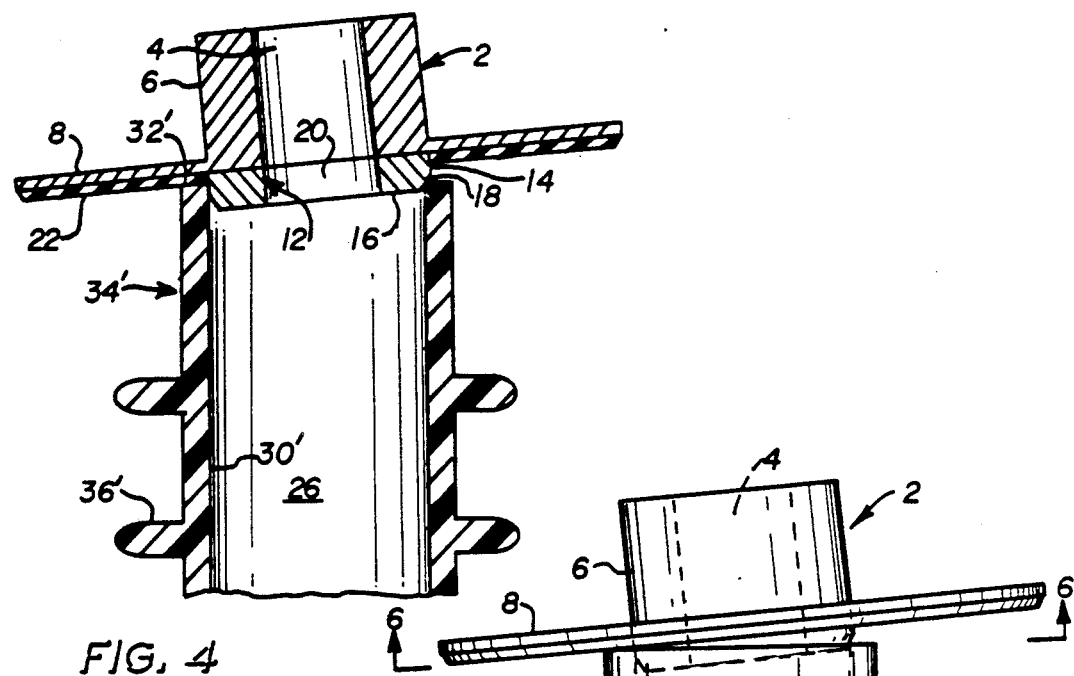
FIG. 4 is similar to FIG. 3, but shows the shape inspection apparatus being tested on an oval or otherwise out of shape container neck.

As used herein the term "container" or "containers" refers to plastic containers and preforms for such containers as well as other types of containers and other objects having sufficient stiffness to permit effective testing by the present invention.

The apparatus and method of the present invention are adapted to be employed with conventional leak detectors well known to those skilled in the art or any other suitable leak detector. Such detectors generally are adapted to receive information from an inspection system and on a rapid basis determine whether a container has a leak. One suitable leak detector for this purpose is that disclosed in U.S. patent application Ser. No. 315,530. Others are those marketed by Wilco under the trade designation Wilkomat and Powers/Emhart marketed under the trade designation Fluidic Finish Selector.

Referring again to FIGS. 1 and 2, there is shown a preferred form of apparatus for use in the present invention. The apparatus has an upper body portion 2 which has a bore 4 passing therethrough which is defined by lateral wall 6 which has a generally radial enlargement 8 toward the lower portion thereof. The bore 4 is in communication with a suitable leak detector 10 which makes a determination as to whether a leak exists between the container and the inspection apparatus.

Lower body portion 12 which may be integrally formed with upper body portion 2 or separately formed and secured to the lower surface thereof by any suitable means as by welding, or press fitting for example has a passageway 20 which is in sealed communication with bore 4 of upper body portion 2. The lower body portion 12 has a generally tubular configuration with a generally cylindrical annular lateral surface 14, a lower annular surface 16 with the lower portion 18 of the lateral surface 14 tapering generally downwardly and inwardly to thereby create a shape similar to the frustum of a cone.

Annular sealing means 22 which may be composed of any suitable sealing material such as polyurethane, for example is sealingly secured to the lower surface of the upper body portion 2 and to the lateral surface 14 of the lower body portion 12.

In this manner, it will be appreciated that if the lower body portion 12 is inserted into the interior of a container neck with the sealing means 22 in annular contact with the upper surface of the container neck, sealed communication between the leak detector 10 through the bore 4 and the container interior will be established.

FIG. 3 illustrates the apparatus of the present invention inserted into a container neck 24 of desired shape. The container neck 24 has an inner annular surface 30, an upper annular surface 32, an outer annular surface 34 on which is an integrally formed thread 36 for securement of closures to the container which may for example, be a PET preform or PET bottle. The lower body portion 12 has its outer surface 14 of generally the same shape as the desired shape and minimum inside diameter D (FIG. 1) of the container neck 24 as measured by the container inner surface 30 but of slightly smaller size in order to permit ready insertion of the lower body portion 12 therein. In a preferred embodiment, the diameter D of the lower body portion 12 taken at the upper portion of the upper portion 14 of the lateral surface corresponds to and is generally equal to the minimum permissible interior diameter as measured at inner surface 30. With the application of downward pressure so as to compress seal 22 between portion 8 of the upper body portion 2 and upper annular surface 32 of a container neck of the desired shape such that the lower body portion enters into the container neck interior 26, sealed communication between the bore 4 and the container interior 26 is established thereby permitting the leak detector 10 to make a determination that the container neck is of a proper shape as no leak exists.

The upper body portion 2 and lower body portion 12 may be made of any suitable material such as stainless steel for example.

Figure 5:
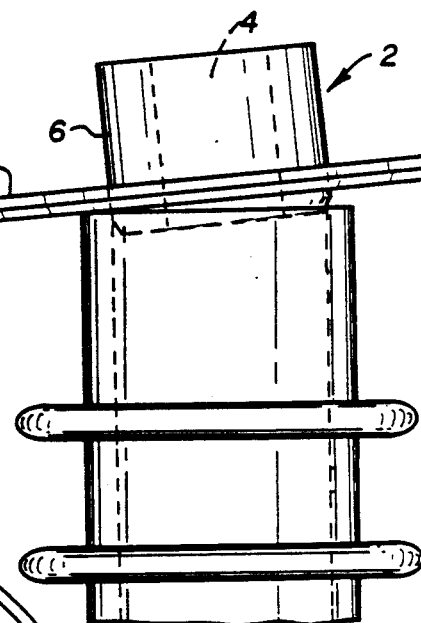
FIG. 5 illustrates a partial elevational view of the apparatus inspecting a defective container neck.
Figure 6:
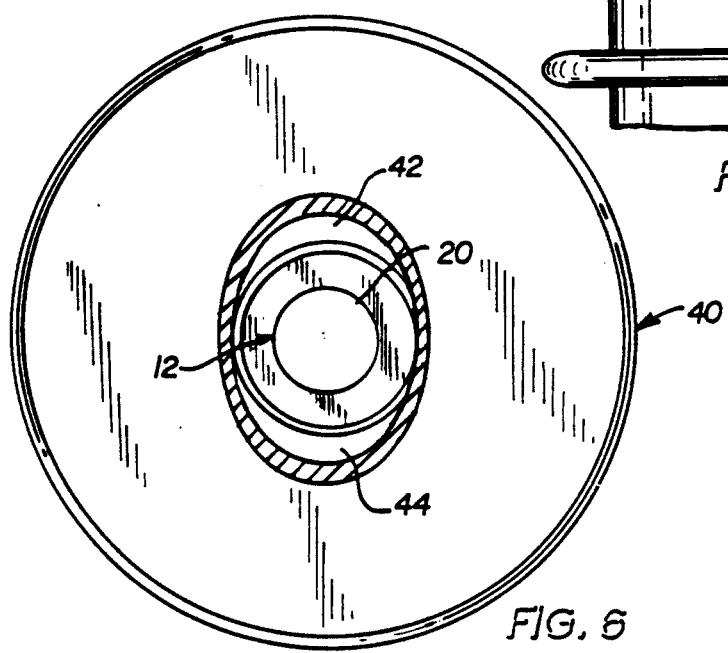
FIG. 6 is a cross-sectional illustration of a portion of the inspection system of FIG. 6 taken through 6—6 of FIG. 5.

Referring to FIG. 4, there is shown a container which is not of the desired shape and in this instance is oval. The shape of the container neck 34' as determined at the inner surface 30' is such that the lower body portion 12 cannot enter into the container neck interior 26, but rather has the tapered portion thereof 18 engage the connection between the annular upper neck surface 32' and the inner surface 30'. As is shown in FIGS. 5 and 6 the failure of the container neck to have the desired shape precludes entry of the lower body portion 12 and sealing of the sealing material 22 against the upper container neck surface 32' In this instance as the container neck is oval, spaces 42, 44 as shown in FIG. 6 are provided, thereby precluding establishing sealed communication between the bore 4 and the container neck interior 26. The leak detector 10 will thus indicate the presence of a leak and the container may be rejected as not possessing the desired shape.

It will be appreciated that in the method of the present invention, the apparatus which preferably is of the type hereinbefore described is reciprocated in a generally axial direction in such a manner as to attempt to enter the container neck interior 26 during descending movement and thereby provide an indication through the leak detector 10 as to whether the container neck is of the desired shape. Upward movement causes the lower body portion 12 to become disengaged from the container and permit the same to be transported by any desired means either for further processing or to be discarded if in fact it has been rejected. Means for transport and rejection are well known to those skilled in the art.

Figure 7:
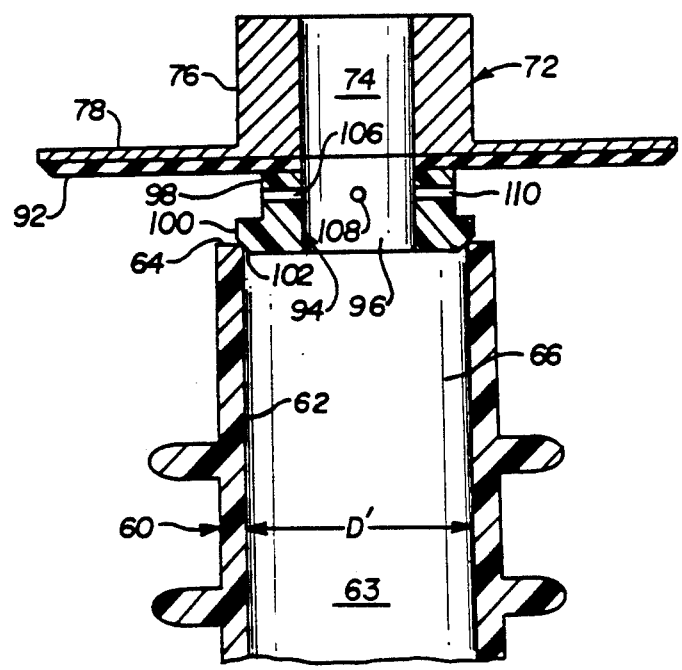
FIG. 7 is a cross-sectional illustration of another embodiment of the present invention.

Referring to FIG. 7, a further embodiment of the invention is shown. A container neck 60 has an inner annular surface 62 which defines an interior opening 63 and an upper annular surface 64. The interior diameter of interior opening 63 is indicated by letter D'. Upper body portion 72 has a bore 74 adapted to communicate with interior opening 63. The upper body portion 72 has a lateral wall 76 and generally radial enlargement 78 under which is secured annular sealing means 92.

Lower body portion 94 has a passageway 96 which communicates with interior opening 63 and leak detector 10 (not shown in this view) (through bore 74). Lower body portion 94 has an upper annular portion 98 and an enlarged lower annular portion 100 which has a downwardly and inwardly tapering annular surface 102.

In this embodiment, venting means which in the form illustrated is a series of openings 106, 108, 110 in upper annular portion 98 to permit passageway 96 to communicate with the exterior and thereby provide a leak indication. In the position shown in FIG. 7, the interior diameter D' is smaller than the desired minimum size and lower body portion 94 cannot enter the container neck thereby precluding establishment of a seal between annular container neck surface 64 and sealing means 92. Venting means 106, 108 110 cause leak detector 10 to conclude that a leak exists and indicates that the container should be rejected. If the container neck 60 were of the desired shape, the lower body portion 94 would have entered the container neck opening 63 (similar to the entry shown in FIG. 3) and preclude venting through openings 106, 108, 110. The leak detector 10 would then detect no leak and would indicate that the container neck is of desired shape.

In the form illustrated in FIG. 7 the four openings (three shown) 106, 108, 110 are generally circumferentially evenly spaced from each other. It will be appreciated that a central concept of this embodiment is the use of one or more openings in the lower body portion 94 so that failure of the lower body portion to fully enter the container neck will result in rejection of the container. The opening or openings may be provided in any desired size, number, shape and position which will accomplish this objective.

The venting means are preferably positioned within the upper annular portion 98 of lower body portion 94.

It will be appreciated, therefore, that the present invention provides a system and apparatus which is adapted for reliable, inexpensive inspection of container necks to determine whether they have the desired shape such that those that do not can be rejected at an early stage of manufacture. All of this is accomplished in a manner which is consistent with known bottle manufacture and filling techniques and existing container handling equipment.

It will be appreciated that while for convenience of disclosure primary emphasis has been placed upon use of the invention in connection with plastic containers which may be in the form of bottles, the invention is not so limited and may be employed with a wide variety of containers.

Whereas particular embodiments of the invention have been described above for purposes of illustration, it will be evident to those skilled in the art that numerous variations of the details may be made without departing from the invention as defined in the appended claims.

We claim:

1. The method of inspecting container necks for the desired configuration including, providing an inspection member having an upper body portion with a longitudinal bore therethrough, a downwardly projecting lower body portion having a passageway in sealed communication with said bore with the lower body portion having an outer surface corresponding generally to the desired shape and minimum permissible diameter of the inner container neck and sealing means for sealing said upper body portion and said lower body portion to a container neck of the desired shape, attempting to insert said lower body portion into said container neck by establishing relative axial closing movement between said inspection member and said container neck, determining whether said container neck and lower body portion are sealingly connected thereby indicating the presence of a container of the desired shape, providing said lower body portion with an annular generally cylindrical lateral surface which determines in a downwardly and inwardly tapered portion, determining whether said container neck is of desired cylindrical shape, and employing said method to check for undesired ovality of said container neck.

2. The method of claim 1 including, providing venting means in said lower body portion, and, employing said venting means to establish a leak condition if a container not of desired shape is being inspected.

3. The method of claim 1 including, employing leak detector means in determining whether a sealed connection exists.

* * * * *

UNITED STATES PATENT AND TRADEMARK OFFICE
CERTIFICATE OF CORRECTION

PATENT NO. : 4,987,768

DATED : January 29, 1991

INVENTOR(S) : HENRY M. DIMMICK, ET AL.

It is certified that error appears in the above-identified patent and that said Letters Patent is hereby corrected as shown below:

Column 1, line 48, a comma --,-- should be inserted after "bottles".

Claim 1, column 6, lines 24-25, "determines" should be --terminates--.

Signed and Sealed this

Twenty-fifth Day of August, 1992

Attest:

DOUGLAS B. COMER

*Attesting Officer*     Acting Commissioner of Patents and Trademarks